US006146748A

United States Patent [19]

Risquez

[11] Patent Number: 6,146,748

[45] Date of Patent: Nov. 14, 2000

[54] LITHOGRAPHIC LAYER FOR A PRINTING BLANKET AND A PRINTING BLANKET FITTED WITH THIS LAYER

[75] Inventor: José Risquez, Soultz, France

[73] Assignee: Rollin SA, Cernay, France

[21] Appl. No.: 09/187,572

[22] Filed: Nov. 5, 1998

[30] Foreign Application Priority Data

Nov. 6, 1997 [FR] France .................................. 97 13978

[51] Int. Cl.[7] ........................................................ B32B 3/00

[52] U.S. Cl. .................................... 428/315.7; 428/307.3; 428/313.3; 428/319.3

[58] Field of Search .............................. 428/307.3, 313.3, 428/315.7, 319.3

[56] References Cited

U.S. PATENT DOCUMENTS

| | | | |
|---|---|---|---|
| 4,093,487 | 6/1978 | Gaworowski et al. | 156/244.16 |
| 4,093,764 | 6/1978 | Duckett et al. | 428/113 |
| 4,337,700 | 7/1982 | Etchell et al. | 101/415.1 |
| 4,599,943 | 7/1986 | Köbler | 101/217 |
| 5,066,537 | 11/1991 | O'Rell et al. | 428/246 |
| 5,069,958 | 12/1991 | Burns, Jr. | 428/246 |
| 5,102,107 | 4/1992 | Simon et al. | 267/152 |
| 5,121,832 | 6/1992 | Fiocchi | 206/3 |
| 5,295,436 | 3/1994 | Kittsteiner et al. | 101/415.1 |
| 5,350,623 | 9/1994 | Derrick | 428/217 |
| 5,644,985 | 7/1997 | Serain et al. | 101/415.1 |

FOREIGN PATENT DOCUMENTS

| | | |
|---|---|---|
| 73773/91 | 10/1991 | Australia . |
| 0 222 680 A2 | 5/1987 | European Pat. Off. . |
| 831 705 | 10/1950 | Germany . |
| 11 65 046 | 3/1964 | Germany . |
| 248 695 A3 | 8/1987 | Germany . |
| WO 96/40528 | 12/1996 | WIPO . |

OTHER PUBLICATIONS

French Search Report dated Jul. 22, 1998, 2 pages.

*Primary Examiner*—Helen L. Pezzuto
*Attorney, Agent, or Firm*—Woodcock Washburn Kurtz Mackiewicz & Norris

[57] ABSTRACT

An improved lithographic layer for a printing blanket and a blanket fitted with this layer is provided. The lithographic layer is made from an elastomer material that is slightly compressible due to the inclusion of a multiplicity of voids or microspheres in the elastomer material. The lithographic layer may be shaped as a sleeve forming the outer layer of a printing blanket.

8 Claims, 1 Drawing Sheet

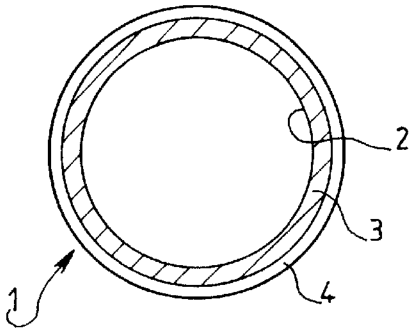
Fig. 1
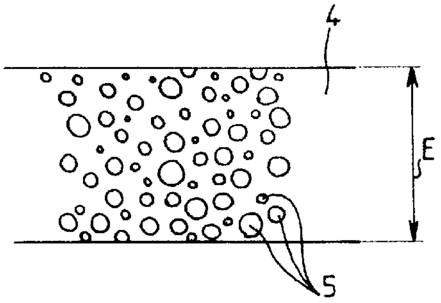
Fig. 2
Fig. 3
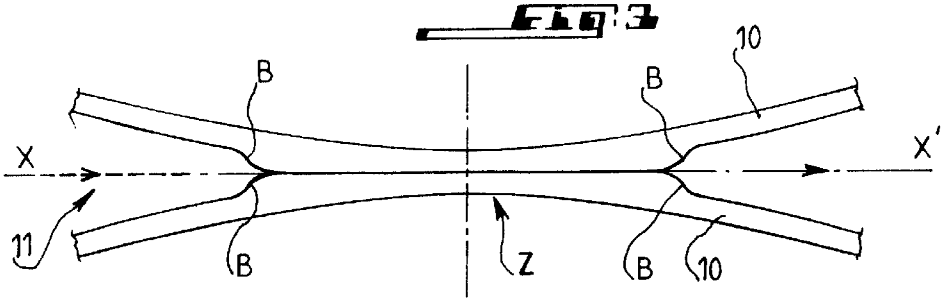
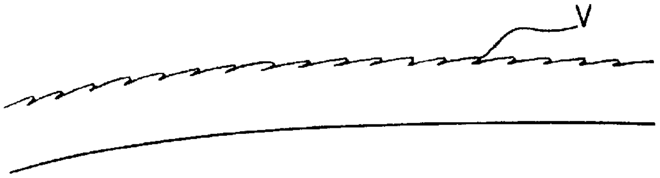
Fig. 4
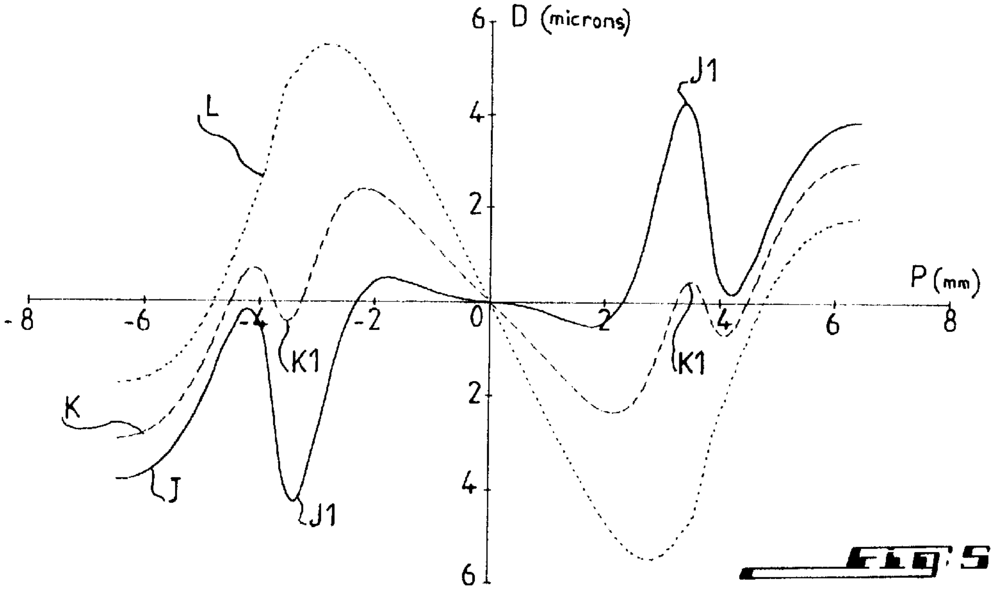
Fig. 5

LITHOGRAPHIC LAYER FOR A PRINTING BLANKET AND A PRINTING BLANKET FITTED WITH THIS LAYER

FIELD OF THE INVENTION

The present invention relates essentially to an improved lithographic layer for a printing blanket. It is also directed to a blanket fitted with this layer.

BACKGROUND OF THE INVENTION

It is known that the blankets for offset printing comprise generally a support lined with one or several successive layers, themselves covered with an outer or printing layer commonly called a lithographic layer.

The lithographic layer is made from an incompressible material, such as nitrile rubber so as to obtain a good offset printing quality. However, such a lithographic layer made from an incompressible hard material exhibits a certain number of inconveniences. For example, it is not effective in absorbing irregularities of the subjacent layer which may result in printing defects.

Moreover, during the recto-verso printing of a sheet of paper passing between two printing cylinders or blankets, there occurs due to the incompressibility of the lithographic layer, a jumping up of the material of this layer which results in folds on either side of the contact zone between both blankets, i.e., at the ingress of the paper into the contact area and at the egress of the paper from this area. These folds are more marked as the lithographic layer is thicker as is the case for most of the lithographic layers used with the blankets of the prior art. Such folds produce, as is understandable, printing defects on the paper.

It should also be pointed out that with an incompressible lithographic layer (i.e., a layer deformable but nevertheless rigid in compression to preserve its volume), one is confronted with printing defects constituted by a slight shift of the colors on the paper, which imparts to the printed image fuzziness or separation of the colors. Once again, this is due to the deformation of the lithographic layer generating folds which somewhat deform the paper to be printed.

It should further be pointed out that during the manufacture of an incompressible lithographic layer, the finish of this layer, i.e., the polishing steps leaves, in spite of all the precautions taken, wavelets upon the external face of the layer, which of course may be result in defects during the printing of the paper.

The object of the present invention is to solve in particular the problems and inconveniences referred to herein above by providing the lithographic layer with some degree of compressibility. While incompressible lithographic layers of the prior art were reputed to possess maximum advantages during printing, the lithographic layer of the present invention, unlike any expectation, imparts to the layer very substantial if not exceptional advantages.

SUMMARY OF THE INVENTION

The lithographic or printing layer according to this invention is made slightly compressible by the inclusion of a multiplicity of voids into the elastomer material constituting the layer. This layer is further characterized in that the voids are constituted by microspheres pre-expansed or expansible within the elastomer material.

According to another characterizing feature, the microsphere content within the elastomer material is comprised of between about 0.5 and 10% by weight of the layer and preferably between 2% and 4% by weight of the layer.

The lithographic layer of this invention is further characterized in that the diameter of the microspheres within the elastomer material of the layer is between about 10 and 30 microns.

The lithographic layer according to this invention exhibits a thickness of less than 0.7 mm and preferably less than or equal to 0.3 mm.

This invention is further directed to a printing blanket comprising a lithographic layer meeting one and/or the other one of the characterizing features stated herein above. This printing blanket may advantageously assume the shape of a sleeve.

The invention will be better understood and further objects, characterizing features, details and advantages thereof will appear better as the following explanatory detailed description proceeds with reference to the attached drawings given by way of nonlimiting example only.

BRIEF DESCRIPTION OF THE DRAWINGS

FIG. 1 is a cross-sectional diagrammatic view of an embodiment of a printing blanket fitted with an outer or lithographic layer forming a sleeve according to the invention.

FIG. 2 is a sectional diagrammatic view on a larger scale of the lithographic layer.

FIG. 3 is a sectional diagrammatic view of the contact zone of two incompressible lithographic layers according to the prior art.

FIG. 4 is a sectional diagrammatic view of the external face of an incompressible lithographic layer according to the prior art after finish by polishing of this layer.

FIG. 5 illustrates the displacement D (in microns) at the surface of the blanket for 3 lithographic layers (curves J, K, L), i.e., the displacement of the lithographic layer versus the position P (in millimeters) in the contact zone between both blankets.

DETAILED DESCRIPTION OF THE INVENTION

FIG. 1 shows a printing blanket 1 according to the invention which has the shape of a cylinder or sleeve and consists of, from the inside to the outside, a support 2 made from metal or from any other rigid material, a compressible layer 3 made from a cellular or non-cellular elastomer and a lithographic layer 4.

The support 2 may have a diameter of about 200 mm and a thickness between 0.1 and 0.3 mm.

One could perfectly, without departing from the scope of the invention, use together with the lithographic layer 4, other layers (not shown) together with the compressible layer 3 (i.e., in any combination of layers between the support 2 and the lithographic layer 4). Alternatively, the support 2 may be omitted or be replaced with equivalent means.

According to the invention and as seen in FIG. 2, the lithographic layer which is made from an elastomer material is made compressible by the inclusion of a multiplicity of voids into the elastomer material. The elastomer material may be of any type of rubber known in the art such as a vulcanizable nitrile rubber or also combinations of nitrile rubber and polysulphide. Likewise the elastomer material could be a cross-linked or non cross-linked thermoplastic elastomer.

The voids are constituted by microspheres 5 incorporated into the elastomer material of the lithographic layer 4. These microspheres 5 may be pre-expansed and incorporated for example into a thermosettable elastomer material which constitutes the lithographic layer 4.

One may also use microspheres which are expansible within the elastomer material, e.g., microspheres which contain a solvent, which under the effect of the heat at about 100° C. to 150° C., causes the expansion of the microspheres. Such expansible microspheres may, for example, be incorporated into a thermoplastic elastomer which may or may not be cross-linked.

Further means may be used for creating void within the lithographic layer 4. For example, one may use a method of chemical expansion of the elastomer layer during the hardening cycle.

The microspheres 5 within the lithographic layer 4 constitutes about 0.5 to 10% by weight of the layer. Preferably the microspheres 5 constitute between 2% and 4% by weight of the layer 4.

Moreover, the diameter of the microspheres 5 within the elastomer material of the layer 4 will be between about 10 and 30 microns. Generally, the thickness E shown in FIG. 2 of the lithographic layer 4 with incorporated microspheres 5 will be below 0.7 mm. Preferably, the thickness E of the layer 4 will be lower than or equal to 0.3 mm.

It should further be pointed out that the Young modulus of the lithographic layer 4 will preferably be in the range of from 1 to 8 megapascals.

The outstanding and/or unforeseeable advantages of the lithographic layer 4 made compressible according to the invention will be explained in detail hereinafter with reference more particularly to FIG. 5 which illustrates the results of simulations and tests effected on the lithographic layer 4, in comparison with a conventional lithographic layer of the prior art, i.e., an incompressible layer without voids.

At first, it should be pointed out that the slightly compressible lithographic layer 4 according to the present invention would advantageously absorb the possible irregularities of any subjacent layer, so that the printing surface will be improved.

The lithographic layer 4, owing to its compressibility, will avoid the presence of folds in the contact zone between two printing cylinders, i.e., the zone of nipping of the paper between these cylinders. In other words, there will occur substantially no deformation at the surface of the lithographic layer 4. In contrast, as seen in FIG. 3, the prior art lithographic layers 10, at the level of the contact zone Z, exhibit folds B at the ingress 11 of the paper along the path X—X" and at the egress of the paper from the contact zone Z. The printing defects due to these folds B during the rolling of the blankets are therefore removed from the lithographic layer 4 of the invention.

Moreover, the absence of folds and therefore of deformations of the lithographic layer 4 would avoid any deformation of the paper and would avoid any shift or off-registration of the colors on the recto-verso faces of the paper. Any distortion of the printed image will therefore be advantageously avoided.

Likewise, the lithographic layer according to this invention is more tolerant to thickness variations without jeopardizing the printing quality.

Furthermore, with the incompressible lithographic layers 10 of the prior art, there were problems of manufacture during the finish polishing. One problem, as shown in FIG. 4, caused wavelets designated V at the surface of the lithographic layer. These wavelets were due to a rolling of the grinder upon the outside face of the layer, thereby causing the pulling out of small chips of material resulting in the wavelets V in question.

Contrary to this, with the more or less compressible lithographic layer 4 according to the invention, one obtains upon polishing at the surface of the layer, much smaller if not non-existent wavelets in view of the flexibility of the lithographic layer 4 and in view of the presence of many microspheres 5 which constitute as many fracture sites at the surface of the layer 4 so that finally the wavelets V are practically removed.

It should also be pointed out that during the finishing by polishing of the lithographic layer 4 according to the invention, due to the flexibility and compressibility of this layer, the heat evolution will be reduced and the machining will be easier.

Referring to FIG. 5, there are seen three curves designated respectively as J, K, and L. The curves represent the displacement (in microns) of three lithographic layers versus the position P (in mm) in the contact zone. Curve J corresponds to an incompressible lithographic layer according to the prior art. Curve K corresponds to a compressible lithographic layer according to the invention and comprising a content of voids or microspheres of 4%. Curve L corresponds to a lithographic layer provided according to the principles of the invention with a content of microspheres of 10%.

In FIG. 5, it is seen that the contact zone has a total length of about 8 mm since it ends at the abscissae −4 and +4 mm, respectively.

The folds B (FIG. 3) created at the surface of the lithographic layer according to the prior art result in peaks of displacement designated at J1 on FIG. 5 at the inlet and at the outlet of the contact zone. These folds affect, in particular, the rate of travel of the paper and create printing defects, as previously explained.

With a printing blanket comprising a lithographic layer 4 according to the invention and possessing a content of microspheres of 4% (curve K), it is seen that the displacement peak designated at K1 on FIG. 5 at the inlet and at the outlet of the contact zone has a very reduced amplitude. In other words, the deformation at the surface of the blanket and more precisely, the lithographic layer at the inlet and at the outlet of the contact zone is nearly zero since the amplitude of the peak K1 is reduced by at least a factor 3 with respect to the peaks J1. It is also seen on FIG. 5 that the deformation in compression at the center of the contact zone is increased but this has no influence upon the paper since it is fully confined within the pressure zone and may not be deformed in compression.

As to the curve L visible on FIG. 5 and corresponding to a lithographic layer 4 according to the invention, and which is very compressible since it comprises a content of voids or microspheres of 10%, it is seen that the peak of displacement at the inlet and at the outlet of the contact zone, as seen on curves J and K, has fully disappeared.

This means that the deformation at the surface of the lithographic layer 4 at the inlet of the contact zone is small and negative.

It is therefore found that with a slightly compressible lithographic layer 4 (curve K), the amplitude of the fold at the inlet and at the outlet of the contact zone is substantially minimized. This fold disappears entirely for a sleeve with a very compressible lithographic layer (curve L). However, since such a very compressible sleeve could exhibit some inconveniences from the standpoint of the mechanical behavior of the lithographic layer and from the standpoint of the chemical behavior of this layer which could become deteriorated, one should adapt a range of compressibility of the lithographic layer permitting to optimize the paper flow rate and to retain the characterizing features and advantages previously state. In other words, one should adopt for the lithographic layer according to the invention a content of voids constituting preferably between about 2% and 4% by weight of the layer.

The invention is not limited to the embodiments described and illustrated which have been given by way of example only. Thus, the elastomer material constituting the lithographic layer and its method of manufacture could be of any kind. The invention also comprises all the technical equivalents of the means described as well as their combinations if the latter are carried out according to its gist.

What is claimed is:

1. A lithographic layer for a printing blanket comprising an elastomer material having a multiplicity of voids in the elastomer material, wherein the voids are constituted by expandible or pre-expansed microspheres located within the elastomer material and make the lithographic layer slightly compressible.

2. A lithographic layer according to claim 1, wherein the content of microspheres within the elastomer material is between about 0.5 to 10% by weight of the layer.

3. A lithographic layer according to claim 2, wherein the content of microspheres within the elastomer material is between 2% to 4% by weight of the layer.

4. A lithographic layer according to claim 1, wherein the diameter of the microspheres within the elastomer material is between 10 to 30 microns.

5. A lithographic layer according to claim 1, wherein the layer has a thickness of less than 0.7 mm.

6. A lithographic layer according to claim 5, wherein the layer has a thickness of less than or equal to 0.3 mm.

7. A printing blanket comprising a lithographic layer according to claim 1.

8. A printing blanket according to claim 7, formed into the shape of a sleeve.

* * * * *